United States Patent [19]
Yamamoto et al.

[11] Patent Number: 5,610,226
[45] Date of Patent: Mar. 11, 1997

[54] (METH)ACRYLATE COPOLYMER AND ITS ELASTOMER COMPOSITIONS

[75] Inventors: Keisaku Yamamoto; Kiyoshi Ikeda; Masahiro Fukuyama; Tadaaki Nishiyama, all of Chiba-ken, Japan

[73] Assignee: Sumitomo Chemical Company, Limited, Osaka, Japan

[21] Appl. No.: 446,136

[22] Filed: May 22, 1995

[30] Foreign Application Priority Data

May 20, 1994 [JP] Japan ..................... 6-106654
Mar. 8, 1995 [JP] Japan ..................... 7-048220

[51] Int. Cl.$^6$ ..................... C08L 31/00; C08F 22/10
[52] U.S. Cl. ..................... 524/559; 526/321; 526/325
[58] Field of Search ..................... 526/321, 325; 524/559

[56] References Cited

U.S. PATENT DOCUMENTS 5,026,807  6/1991  Ohira et al. ..................... 526/321

FOREIGN PATENT DOCUMENTS

| A1-0367577 | 5/1990 | European Pat. Off. . | |
|---|---|---|---|
| 1104700 | 4/1961 | Germany | 526/321 |
| 54-138034 | 10/1979 | Japan | 526/321 |
| 61-2711 | 1/1986 | Japan | 526/321 |
| 2-22313 | 1/1990 | Japan . | |
| 6-122731 | 5/1994 | Japan . | |
| 6-157415 | 6/1994 | Japan . | |
| 1146290 | 3/1969 | United Kingdom . | |

OTHER PUBLICATIONS

Toyoshima et al., *New Acrylic Rubber With Excellent Low Temperature Resistance*, American Chemical Society Meeting of the Rubber Division, Detroit, MI, Oct. 8–11, 1991, Paper No. 32, pp. 1–33.

Fedors, *A Method for Estimating Both the Solubility Parameters and Molar Volumes of Liquids*, Polymer Engineering and Science, Feb., 1974, vol. 14, No. 2, pp. 147–154.

Brandrup et al., Polymer Handbook, Third Editon, pp. VI–234–235 (1989).

*Primary Examiner*—Joseph L. Schofer
*Assistant Examiner*—N. Sarofim
*Attorney, Agent, or Firm*—Cushman Darby & Cushman IP Group of Pillsbury Madison & Sutro, LLP

[57] ABSTRACT

A composition is disclosed which contains about 80.0 to about 99.9% by weight of a (meth)acrylate monomer having a structure represented by a formula (I) or a mixture of the (meth)acrylate monomer and alkyl acrylate having an alkyl ester comprising alcohol of 1 to 8 carbon atoms, and about 20.0 to about 0.1% by weight of a crosslinking monomer copolymerizable with the (meth)acrylate monomer. The composition can be used in formulating elastomeric compositions having a favorable balance of properties.

15 Claims, 1 Drawing Sheet

(METH)ACRYLATE COPOLYMER AND ITS ELASTOMER COMPOSITIONS

FIELD OF THE INVENTION

The present invention relates to a (meth)acrylate copolymer and an elastomer composition comprising the (meth)acrylate copolymer.

DESCRIPTION OF THE RELATED ART

Heretofore, so-called acrylic rubbers comprised of a (meth)acrylate copolymer have exhibited heat resistance and oil resistance. However, the trade has more recently been demanding an increased level of heat resistance and oil resistance. There has also been an increased demand for a high level of low temperature resistance.

The oil resistance and low temperature resistance are inconsistent properties in acrylic rubber. Accordingly, it is very difficult to improve both oil resistance and low temperature resistance and still obtain a well-balanced acrylic rubber. For example, an acrylic rubber obtained from a copolymer having ester groups introduced therein as one component is said to have improved low temperature resistance as is described in (Japanese Kokai Publication No. 209907/1990); however, the rubber does not necessarily have sufficient oil resistance. An acrylic rubber produced by using a copolymer having ether bonding introduced therein (that is, alkoxy group) as one component is said to have improved oil resistance and low temperature resistance as is disclosed in Journal of the Society of Rubber Industry, Japan Vol. 53 (6) 367 (1980), but the acrylic rubber nonetheless has poor heat resistance.

Accordingly, it is highly desired to develop a copolymer capable of being used to obtain an acrylic rubber having both good oil resistance and good low temperature resistance, while maintaining a high level of heat resistance.

SUMMARY OF THE PRESENT INVENTION

An object of the present invention is to provide a copolymer capable of being used to obtain an acrylic rubber having both good oil resistance and good low temperature resistance and also a high level of heat resistance.

As a result of an intensive research study, we have discovered a copolymer which satisfies the above-mentioned and other objectives. We have discovered that an acrylic rubber having good oil resistance and good low temperature resistance, and having heat resistance maintained at a high level can be obtained when an acrylic rubber is produced by using a (meth)acrylate copolymer having a specific structure.

According to the present invention, the (meth)acrylate copolymer comprises about 80.0 to about 99.9% by weight of either a (meth)acrylate monomer having a structure represented by formula (I):

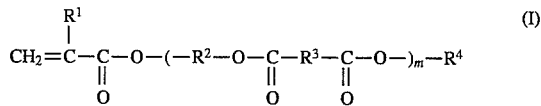

wherein $R^1$ represents a hydrogen atom or a methyl group, $R^2$ and $R^3$ independent of one anther represent an alkylene group having 1 to 20 carbon atoms, a phenylene group or a cyclohexanylene group, $R^4$ represents an alkyl group having 1 to 20 carbon atoms or a phenyl group or a derivative of a phenyl group, and m represents an integer from 1 to 10, or a mixture of the (meth)acrylate monomer and at least one alkyl acrylate having an alkyl ester comprising alcohol of 1 to 8 carbon atoms; and about 20.0 to about 0.1% by weight of a crosslinking monomer copolymerizable with the (meth)acrylate monomer.

DETAILED DESCRIPTION OF THE PRESENT INVENTION

Figure 1:
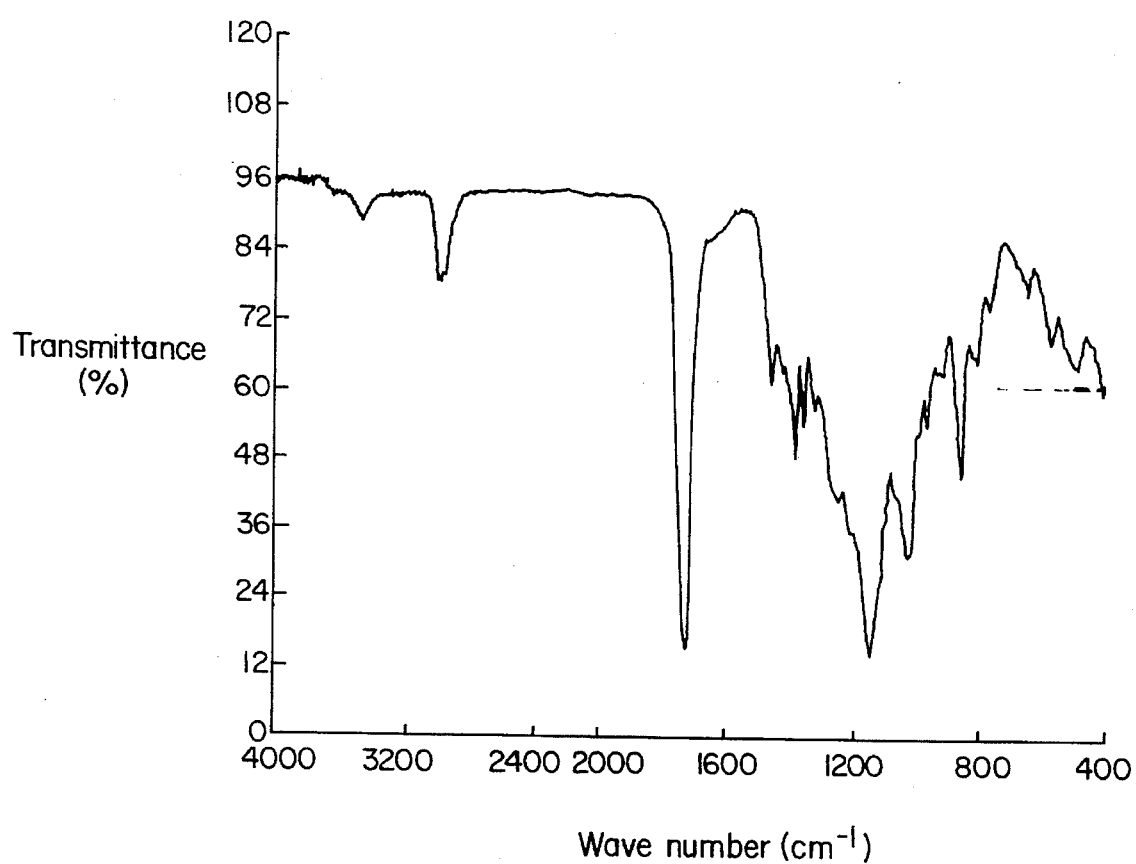
FIG. 1 is an infra-red absorption spectrum of the copolymer obtained in Example 1.

A (meth)acrylate copolymer of the present invention has a (meth)acrylate unit having a structure represented by the above-mentioned formula (I) as one constituent component.

A salient characteristic of the present invention is that the (meth)acrylate copolymer of the present invention has the following structure as one constituent component:

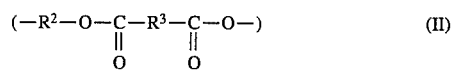

It is important that the carbonyl moieties in the respective ester structures in the aforesaid formula (II) are each adjacent and bonded to $R^3$. (This can also be deemed a reverse ester structure about $R^3$ wherein $R^3$ is bonded to the carbonyl group in each adjacent ester structure.) When this condition is not satisfied, it is thought to be impossible to achieve thoroughly the objects of the present invention.

In the (meth)acrylate copolymer of the present invention, $R^1$ represents a hydrogen atom or a methyl group. The (meth)acrylate copolymer of the present invention therefore means an acrylate copolymer or a methacrylate copolymer.

$R^2$ and $R^3$ each independently represents an alkylene group having 1 to 20 carbon atoms, a phenylene group or a cyclohexanylene group.

The alkylene group can be straight or branched, and when the number of carbon atoms is over 20, the oil resistance becomes poor. Representative alkylene groups having 1 to 20 carbon atoms include, among others, a methylene group, an ethylene group, a n-propylene group, an iso-propylene group, a n-butylene group, and the like. By preference the alkylene group has 1 to 10 carbon atoms, of which the —$CH_2CH_2$— group is the most preferred because the desired product having an excellent balance of good oil resistance and good low-temperature resistance can be obtained.

Representative of the phenylene group are, among others, an o-phenylene group, a m-phenylene group and a p-phenylene group, and the like.

Representative cyclohexanylene groups include, among others, an o-cyclohexanylene group, a m-cyclohexanylene group and a p-cyclohexanylene group, and the like.

When $R^2$ and $R^3$ are both alkylene groups, it preferred that the total number of carbon atoms is 2 to 20, more preferably 2 to 10, and most preferably 4 to 9, in order to be compatible with good oil resistance and good low temperature resistance.

$R^4$ represents an alkyl group having 1 to 20 carbon atoms, a phenyl group or their derivatives.

The alkyl groups having 1 to 20 carbon atoms can be straight or branche. Representative alkyl groups include methyl, ethyl, n-propyl, iso-propyl, n-butyl, iso-butyl, 2-ethylhexyl, and the like. By preference, the alkyl group has 1 to 10 carbon atoms, of which —$CH_2CH_2$—, is the most preferred because an excellent balance of good oil resistance and good low-temperature resistance can be achieved. When the number of carbon atoms is greater than 20, oil resistance becomes poor.

Representative derivatives of the phenyl group include, among others, a benzyl group, a 2-methyl phenyl group, a 3-methyl phenyl group and a 4-methyl phenyl group and the like.

In formula (I) m represents an integer of 1 to 10, more preferably represents an integer of 1 to 5, and most preferably is 1. The value of m may exceed 10, although production costs can then become excessive.

Representative species of the (meth)acrylate copolymer represented by formula (I) include, for example, the compounds represented by the following formulae:

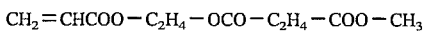
$CH_2=CHCOO-C_2H_4-OCO-C_2H_4-COO-CH_3$

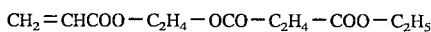
$CH_2=CHCOO-C_2H_4-OCO-C_2H_4-COO-C_2H_5$

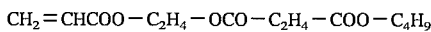
$CH_2=CHCOO-C_2H_4-OCO-C_2H_4-COO-C_4H_9$

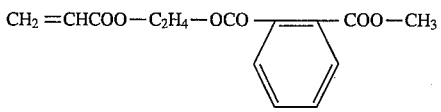

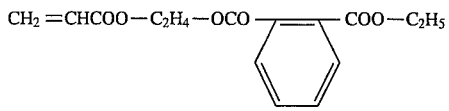

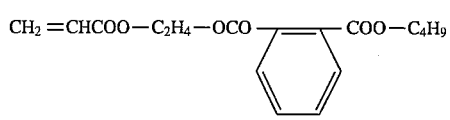

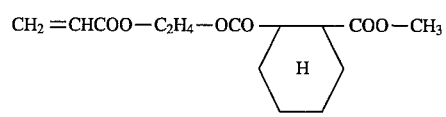

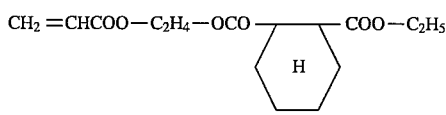

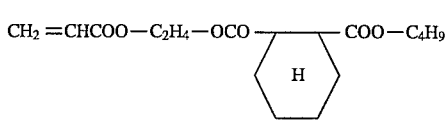

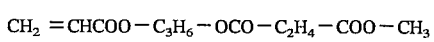
$CH_2=CHCOO-C_3H_6-OCO-C_2H_4-COO-CH_3$

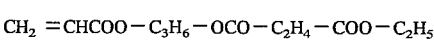
$CH_2=CHCOO-C_3H_6-OCO-C_2H_4-COO-C_2H_5$

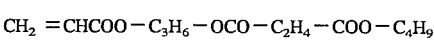
$CH_2=CHCOO-C_3H_6-OCO-C_2H_4-COO-C_4H_9$

These compounds may be used independently or a mixture of any thereof can be used.

Exemplary alkyl acrylates having an alkyl ester comprising an alcohol of 1 to 8 carbon atoms used in mixing with a (meth)acrylate monomer include, among others, methyl acrylate, ethyl acrylate, n-propyl acrylate, iso-propyl acrylate, n-butyl acrylate, iso-butyl acrylate, n-amyl acrylate, n-hexyl acrylate, 2-ethylhexyl acrylate, n-octyl acrylate and the like. Among these, ethyl acrylate, n-butyl acrylate and iso-butyl acrylate are preferred. The acrylates can be used independently or a mixture of any thereof can be used.

Exemplary crosslinking monomers which are copolymerizable with a (meth)acrylate monomer(s) include diene monomer, unsaturated carboxylate monomer containing unsaturated group, vinyl monomer containing epoxy group, vinyl monomer containing carboxyl group, vinyl monomer containing active halogen atom, vinyl monomer containing hydroxyl group, vinyl monomer containing amide group and the like. The crosslinking monomers can be used individually, or a mixture of any can be used.

Representative examples of a diene monomer include butadiene, ethylidene norbornene, isoprene, piperylene, divinyl benzene, vinylcyclohexene, chloroprene, methylbutadiene, cyclopentadiene, methylpentadiene, dimethylvinylstyrylsilane and the like.

Representative examples of an unsaturated carboxylate monomer containing an unsaturated group(s) include ethylene glycol di(meth)acrylate, propylene glycol di(meth)acrylate, dihydrocyclopentadienyl(meth)acrylate, dihydrocyclopentadienyloxyethyl(meth)acrylate, vinyl(meth)acrylate, dimethylvinylmethacryloxymethylsilane and the like.

Representative examples of vinyl monomer containing epoxy group(s) include glycidyl (meth)acrylate, alkylglycidyl ether and the like.

Representative examples of a vinyl monomer containing carboxyl group(s) include(meth)acrylic acid, itaconic acid, mono n-butyl fumarate, mono ethyl maleate, mono n-butyl maleate, 2-methacryloyloxyethyl succinate, 2-methacryloyloxyethyl phthalate, 2-methacryloyloxyethyl hexahydrophthalate, 2-methacryloyloxyethyl maleate and the like.

Representative examples of a vinyl monomer containing active halogen atom(s) include 2-chloroethyl vinyl ether, vinyl chloroacetate, allyl chloroacetate and the like.

Representative examples of a vinyl monomer containing hydroxyl group(s) are 2-hydroxyethyl acrylate, 2-hydroxypropyl methacrylate, 2-hydroxyethyl methacrylate, N-methylol (meth)acrylamide and the like.

Representative examples of a vinyl monomer containing an amide group(s) include acrylamide, methacrylamide or the like.

These monomers can be used singly or in a mixture of any of these.

The (meth)acrylate copolymer of the present invention comprises about 80.0 to about 99.9% by weight, preferably about 90.0 to about 99.5% by weight, of the above-mentioned (meth)acrylate represented by the formula (I) or a mixture of the (meth)acrylate monomer and alkyl acrylate having an alkyl ester comprising alcohol of 1 to 8 carbon atoms; and about 20.0 to about 0.1% by weight, preferably about 10.0 to about 0.5% by weight, of at least one crosslinking monomer copolymerizable with the (meth)acrylate monomer.

When the content of the crosslinking monomer is less than about 0.1% by weight, there is almost no crosslinking. When the content of the crosslinking monomer is greater than about 20.0% by weight, the tensile elongation of the vulcanized products becomes poor.

When the (meth)acrylate copolymer is a mixture of a (meth)acrylate monomer and alkyl acrylate having an alkyl ester comprising alcohol of 1 to 8 carbon atoms, the alkyl acrylate content is about 5.0 to about 94.9% by weight, preferably about 10.0 to about 89.5% by weight of the total of the (meth)acrylate monomer and the alkyl acrylate.

When the (meth)acrylate copolymer is a mixture of a (meth)acrylate monomer and n-butyl acrylate, the content of n-butyl acrylate is preferably about 5 to about 50% by weight, more preferably about 10 to about 40% by weight.

Through the addition of alkyl acrylate in the above-mentioned range, the mechanical properties such as tensile strength, of the vulcanized rubber obtained by vulcanization of the (meth)acrylate copolymer can be further improved.

The viscosity average molecular weight of the (meth)acrylate copolymer of the present invention is usually about 10 thousand to about 5 million, and is preferably about 100 thousand to about 3 million. When this viscosity average molecular weight is less than about 10 thousand, the tensile strength of the vulcanized products may be insufficient. When the viscosity average molecular weight is greater than about 5 million, processability may become worse in some cases.

The (meth)acrylate copolymer of the present invention can be prepared by the usual methods known to those skilled in the art such as bulk polymerization, emulsion polymerization, and solution polymerization by using of a free-radical initiator.

A representative polymerization procedure is emulsion polymerization. Representative examples of an emulsifier for use in producing the (meth)acrylate copolymer via emulsion polymerization include, among others, alkyl sulfate, alkyl aryl sulfonate, higher fatty acid salt(s) and the like.

In general, the polymerization reaction temperature is about 0° C. to about 9° C., preferably about 3° C. to about 80° C.

A radical initiator can be used to start the polymerization reaction, and representative radical initiators include, for instance, organic peroxides such as benzoylperoxide, cumenehydroperoxide, paramenthanehydroperoxide and the like; azo compounds such as azobisisobutylonitrile; inorganic persufuric acid salts such as potassium persulfate, ammonium persulfate and the like; redox catalysts represented by the combination of organic peroxide and iron sulfate and the like. In general, the radical initiator is used in an amount in the range of about 0.01 to about 2% by weight per the mixture of monomers.

A molecular weight modifier is used as needed, and examples of molecular weight modifiers include, among others, t-dodecylmercaptane, dimethylxanthogen disulfide and the like.

After attaining the desired or targeted polymerization conversion, the polymerization reaction is stopped by adding a terminator, such as N,N-diethylhydroxylamine or the like, to obtain a latex.

Next, unreacted monomer in the obtained latex is removed by steam distillation and the like.

After adding an antioxidant, such as phenols, amines or the like, the latex is then coagulated by mixing with an aqueous solution of a metal salt such as an aqueous solution of aluminum sulfate, an aqueous solution of calcium sulfate or the like. The (meth)acrylate copolymer can be obtained by drying the coagulated latex.

The invention also includes an elastomer composition. This elastomer composition comprises the above-described (meth)acrylate copolymer, a reinforcing filler and a crosslinking agent.

The reinforcing filler is preferably carbon black. The amount of carbon black is about 5 to about 400 parts by weight, and is preferably about 10 to about 200 parts by weight, per 100 parts by weight of the (meth)acrylate copolymer. When the amount of carbon black is less than about 5 parts by weight, an adequate reinforcing effect cannot be obtained. When the amount of carbon black is greater than about 400 parts by weight, the viscosity of the elastomer composition increases to such an extent that its processability becomes poor.

In general, an effective crosslinking amount of the crosslinking agent used in the elastomer composition. The elastomer composition can, for instance, contain a crosslinking agent in an amount of about 0.1 to about 20 parts by weight, although the amount is preferably about 0.2 to about 10 parts by weight, per 100 parts by weight of the (meth)acrylate copolymer. When the amount is less than about 0.1 part by weight, there is almost no vulcanization. When the amount is greater than about 10 parts by weight, mechanical properties of the vulcanized products may become poor.

As a general matter, a suitable crosslinking agent is selected in concert with the above-mentioned crosslinking monomer.

In case where a diene monomer(s) and/or an unsaturated carboxylate monomer(s) containing an unsaturated group is used as the crosslinking monomer, representative crosslinking agents include sulfur, an organic compound containing sulfur, an organic peroxide and the like.

In the case where a vinyl monomer containing epoxy group(s) is used as the crosslinking monomer, representative crosslinking agents include polyamine, polycarboxylic acid, acid anhydride, polyfunctional organic acid, polyamide, sulfonamide, dithiocarbamic acid salt, ammonium organic carboxylate and the like.

In the case where a vinyl monomer containing a carboxyl group(s) is used as the crosslinking monomer, representative crosslinking agents include polyamine, polyepoxide, polyol and the like.

In the case where a vinyl monomer containing active halogen atom(s) is used as a crosslinking monomer, representative crosslinking agents include metal soap, ammonium organic carboxylate, polyamine, polycarbamate and the like.

In the case where a vinyl monomer containing hydroxyl group(s) is used as a crosslinking monomer, representative crosslinking agents include polyisocyanate, polycarboxylic acid, alkoxymethyl melamine and the like.

In the case where a vinyl monomer containing amide group(s) is used as a crosslinking monomer, representative crosslinking agents include aminoformaldehyde and the like.

Sulfer can be used in the form of powdered sulfur, precipitated sulfur, colloidal sulfur, insoluble sulfur, or high-dispersed sulfur.

An organic compound containing sulfur includes a compound emitting active sulfur by thermal dissociation such as, for instance, tetramethylthiuram disulfide, 4,4'-dithiomorpholine and the like. In principle, any thiuram accelerator can be used.

Organic peroxides include 2,5-dimethyl-2,5-di(t-butylperoxy)hexyne, 2,5-dimethyl-2,5-di(t-butylperoxy)hexane, 1,3-bis(t-butylperoxyisopropyl)benzene, dicumylperoxide, dibutylperoxide, 1,1-di-t-butylperoxy-3,3,5-trimethylcyclohexane, t-butylcumylperoxide, t-butylperoxy-isopropylcarbonate and the like.

Polyamines include triethylenetetramine, methylenedianiline, diethylenetriamine and the like.

Polycarboxylic acids include adipic acid, octadecyl dicarboxylic acid and the like.

Acid anhydrides include pyromellitic anhydride, maleic anhydride, dodecenyl succinic anhydride and the like.

Polyfunctional organic acids include isocyanuric acid and the like.

Dithiocarbamic acid salts include hexamethylenediaminecarbamate, zinc dimethyldithiocarbamate and the like.

Ammonium organic carboxylates include ammonium benzoate, ammonium adipate and the like.

Polyepoxides include ethylene glycol diglycidyl ether, 1,6-hexanediol diglycidyl ether and the like.

Polyols include 1,4 butanediol, 1,1,1-trimethylolpropane and the like.

Metal soaps include sodium stearate, potassium stearate and the like.

Polyisocyanate compounds include hexamethylene diisocyanate, tolylene diisocyanate, diphenylmethane diisocyanates and the like.

A crosslinking co-agent can be added to these crosslinking agents in order to shorten vulcanization time, to allow a lower vulcanization temperature and to improve the properties of the vulcanized products. The crosslinking co-agent can be used in an amount of, for instance, about 0.1 to about 20 parts by weight, and preferably about 0.2 to about 10 parts by weight, per 100 parts by weight of the (meth)acrylate copolymer.

A sulfur crosslinking agent can be used in combination with a crosslinking co-agent such as thiazols such as mercaptobenzothiazol and the like; thiurams such as tetramethylthiuram disulfide and the like; guanidines such as diphenyl guanidine and the like; and dithiocarbamic acid salts such as zinc dimethyldithio carbamate and the like.

An organic peroxide crosslinking agent can be used in combination with a crosslinking co-agent such as ethyleneglycol dimethacrylate, 1,3-butanediol dimethacrylate, 1,4-butanediol di(meth)acrylate, 1,6-hexanediol di(meth)acrylate, polyethyleneglycol dimethacrylate, 2,2'-bis(4-methacryloyl diethoxyphenyl)propane, trimethylolpropane tri(meth)acrylate, pentaerythritol triacrylate, divinylbenzene, N,N'-methylenebisacrylamide, p-quinonedioxime, p,p'-dibenzoyl quinonedioxime, triazine dithiol, triallyl cyanurate, triallyl isocyanurate, bismaleimide, silicon oil having a high vinyl-group content and the like.

A metal soap crosslinking agent can be used in combination with a crosslinking co-agent such as sulfur and dipentamethylenethiuram tetrasulfide.

A polyamine crosslinking agent can be used in combination with a crosslinking co-agent such as diphenyl guanidine and diorthotolyl guanidine.

In the elastomer composition of the present invention, additional ingredients can be included, such as a plasticizer(s) and a processing aid(s).

The amount of the plasticizer used is usually about 200 parts by weight or less, and is preferably about 3 to about 100 parts by weight, per 100 parts by weight of the (meth) acrylate copolymer. By using a plasticizer(s) within abovementioned range, the low temperature resistance of the vulcanized products can be further improved. When the amount of the plasticizer used is greater than about 200 parts by weight, the mechanical properties of the vulcanized products may become poor. Representative plasticizers include fumaric acid derivatives, adipic acid derivatives, polyetherester and the like.

The amount of processing aid used is usually about 20 parts by weight or less, and is preferably about 0.3 to about 10 parts by weight, per 100 parts by weight of the (meth) acrylate copolymer. Using a processing aid(s) within abovementioned range prevents the composition from adhering to processing apparatus. When the amount of the processing aid used is greater than about 20 parts by weight, the lubricity is too great and the processing may become difficult. Representative processing aids include higher fatty acids, their metal salts or their amide salts and the like.

The elastomer composition of the present invention can be obtained by blending together each component of the present invention, and if necessary or desired, along with well-known other additives such as antioxidants, vulcanization accelerator(s), zinc oxide, reinforcing agent(s), filler(s), softener(s) and the like by popular kneading machines such as a mixing roll, an internal mixer and the like.

The elastomer composition can be molded into a desired shape and cured, i.e. vulcanized, because the vulcanizable rubber composition can be molded and vulcanized. The vulcanization can occur in a primary and a so-called after vulcanization. The primary vulcanization is performed usually by heating for 1 to 30 minutes at 120° C. or more, preferably 150° to 220° C., under a pressure of 50 to 150 kg/cm$^2$. The after vulcanization is performed heating for 1 to 20 hours at 150° to 200° C., as needed.

Advantageously, various sealing materials, such as gaskets, o-rings, packings, oil seals and the like, as well as hoses, belts, rolls and the like are made from the (meth) acrylate copolymer and the elastomer composition of the present invention which has good low temperature resistance, good oil resistance and a high level of heat resistance.

The (meth)acrylate copolymer and elastomer composition of the present invention are described in Japanese Application 06-106654 filed May 20, 1994 and in Japanese Application 07-48220 filed Mar. 8, 1995, the complete disclosures of which are incorporated herein by reference.

The present invention is illustrated by the following non-limiting examples.

EXAMPLE 1

200 g of unsaturated carboxylic acid having the chemical formula $CH_2$=$CHCOOC_2H_4OCOC_2H_4COOH$, 400 g of ethyl alcohol, 300 ml of toluene and 1 ml of sulfuric acid were fed in a flask with a stirrer and a Deanstark water separator.

Next, reflux by heating was performed and the produced water was removed from the water separator.

After 3 hours, heating was stopped and the flask was allowed to cool to the room temperature. The reaction mixture in the flask was washed with 500 ml of water, 50 ml of 5% sodium hydrogen carbonate aqueous solution and 500 ml of 10% of sodium chloride aqueous solution in order.

After the oil layer was dried with sodium sulfate anhydride, the oil layer was distilled under reduced pressure (b.p. 142° C./2 mmHg) in the presence of an added polymerization inhibitor BHT.

A colorless transparent liquid product was obtained at a conversion rate of 42%. This product was analyzed by Infra-Red Spectrophotometer (1720 X manufactured by Perkin Elmer Company) and this product was certified acrylate A in which $R^1$ was a hydrogen atom, $R^2$ and $R^3$ were each an ethylene group, $R^4$ was an ethyl group, and m was equal to 1 in the formula (I).

Next, 95 parts by weight of the obtained acrylate A, 5 parts by weight of glycidyl methacrylate, 200 parts by weight of water, 4 parts by weight of sodium lauryl sulfate, 0.25 parts by weight of ammonium persulfate and 0.30 parts by weight of iron sulfate were fed in an autoclave under a nitrogen atmosphere ("nitrogen blanket") and the continued stirring was conducted while at a reaction temperature of 5° C. After 6 hours, 0.5 parts by weight of N,N-diethylhydroxylamine were added and the reaction was stopped.

Next, unreacted monomer was removed from the product by steam-flocking, 0.25% by weight of calcium chloride aqueous solution was added to the obtained latex and the latex was coagulated. The coagulated mass was washed fully with water and dried at 50° C. for 4 hours to obtain a copolymer.

The obtained copolymer comprised 97.0% by weight of the acrylate A having a structure represented by the abovementioned formula (I) of the present invention in which $R^1$ was a hydrogen atom, and $R^2$ and $R^3$ were each ethylene groups, and $R^4$ was an ethyl group, and m was equal to 1;

and 3.0% by weight of glycidyl methacrylate which was the crosslinking monomer copolymerizable with acrylate A.

Its viscosity average molecular weight was 197 thousand (Intrinsic viscosity [η] was 1.25 dl/g). The infra-red spectrum of the obtained copolymer is shown in FIG. 1.

Infra-red analysis of the obtained copolymer was measured using the attenuated total reflection method with an Infra-Red Spectrophotometer (1720 X manufactured by Perkin Elmer Company).

After dissolving the copolymer in chloroform, the intrinsic viscosity was measured using an Ubbelohde viscometer at 30° C. The viscosity average molecular weight Mv of the copolymer was calculated from the following equation (refer to Polymer Handbook, Third Edition, VII-8, J. Brandrup, E. H. Immergut, A Wiley-Interscience Publication (1989). [η]= $31.4 \times 10^{-3} \cdot Mv^{0.68}$ (ml/g)

Next, 40 parts by weight of FEF carbon black (Seast S0 manufactured by Tokai Carbon Company), 1 part by weight of stearic acid, 0.5 part by weight of stearyl amine, 2 parts by weight of Nauguard 445 (amine antioxidant manufactured by Uniroyal Company), and, as the crosslinking agent and crosslinking coagents, 0.8 parts by weight of isocyanuric acid, 1.5 parts by weight of octadecyltrimethylammonium bromide and 2.3 parts by weight of diphenylurea were added per 100 parts by weight of the obtained copolymer and were kneaded with a 6 inch mixing roll to obtain the compound.

The optimum curing time of the compound was measured under the condition of 170° C. using an oscillating disc rheometer manufactured by Toyo Seiki Company.

The compound was vulcanized at 170° C. for 30 minutes, and the oil resistance and low temperature resistance of the obtained vulcanized rubber were measured according to JIS K6301 (ASTM D471, D1053). The low temperature resistance ($T_{10}$) was −24° C. and the oil resistance (Volume swell) was 0.7%.

The low temperature resistance test was performed according to the Gehmen torsion test and the oil resistance test was performed at 150° C. for 70 hrs by using JIS No. 3 oil (ASTM No. 3 oil).

EXAMPLES 2–7

The same general conditions as those in Example 1 were followed except that Examples 2–7 were performed under the conditions listed in Table 1 and 2.

COMPARATIVE EXAMPLE 1

The same general conditions as those in Example 1 were followed except that an acrylic rubber on the market (comprising 98.6% by weight of ethyl acrylate and 1.4% by weight of glycidyl methacrylate and having a viscosity average molecular weight of 651 thousand (intrinsic viscosity [η] of 2.88 dl/g)) was used.

The properties of the product were evalutated, and the low temperature resistance ($T^{10}$) was −12° C. and the oil resistance (Volume swell) was 12.4%.

COMPARATIVE EXAMPLES 2–3

The same general conditions as those in Comparative Example 1 were followed except Comparative Example 2–3 were performed under the conditions listed in Table 2.

TABLE 1

| | Examples | | | | |
|---|---|---|---|---|---|
| | 1 | 2 | 3 | 4 | 5 |
| Composition of the copolymer (wt %) | | | | | |
| n-butyl acrylate | 0 | 48.0 | 29.0 | 15.0 | 0 |
| acrylate A | 0 | 0 | 0 | 0 | 49.5 |
| acrylate A | 97.0 | 49.0 | 68.0 | 82.0 | 49.5 |
| glycidyl methacrylate | 3.0 | 3.0 | 3.0 | 3.0 | 3.0 |
| Intrinsic viscosity [η] (dl/g) | 1.25 | 2.08 | 1.07 | 1.12 | 2.06 |
| Viscosity average molecular molecular weight (Mv) (thousands) | 197 | 426 | 157 | 167 | 410 |
| Properties of vulcanized product | | | | | |
| Low temperature resistance Gehmen torsion test ($T^{10}$) (°C.) | −24 | −20 | −22 | −24 | −37 |
| Oil resistance (Volume swell) | 0.7 | 6.3 | 1.0 | −0.7 | 36.2 |

TABLE 2

| | Example | | Comparative Example | | |
|---|---|---|---|---|---|
| | 6 | 7 | 1 | 2 | 3 |
| Composition of the copolymer (wt %) | | | | | |
| ethyl acrylate | 0 | 0 | 98.6 | 0 | 48.0 |
| n-butyl acrylate | 29.0 | 15.0 | 0 | 97.0 | 49.0 |
| acrylate A | 68.0 | 82.0 | 0 | 0 | 0 |
| glycidyl methacrylate | 3.0 | 3.0 | 1.4 | 3.0 | 3.0 |
| Intrinsic viscosity [η] (dl/g) | 1.27 | 1.14 | 2.83 | 1.83 | 2.07 |
| Viscosity average molecular molecular weight (Mv) (thousands) | 201 | 172 | 651 | 345 | 413 |
| Properties of vulcanized product | | | | | |
| Low temperature resistance Gehmen test ($T^{10}$) (°C.) | −29 | −28 | −12 | −46 | −30 |
| Oil resistance (Volume swell) | 4.2 | 1.0 | 12.4 | 83.6 | 39.3 |

What is claimed is:

1. A (meth)acrylate copolymer comprising about 80.0 to about 99.9% by weight of a (meth)acrylate monomer having a structure represented by the following formula (I):

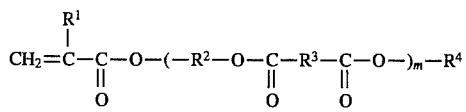

wherein $R^1$ represents a hydrogen atom or a methyl group, $R^2$ and $R^3$ each independently represent an alkylene group having 1 to 20 carbon atoms, a phenylene group or a cyclohexanylene group, $R^4$ represents an alkyl group having 1 to 20 carbon atoms, a phenyl group or a substituted phenyl group which is at least one member selected from the group consisting of benzyl, 2-methyl phenyl, 3-methyl phenyl and a 4-methyl phenyl, and m represents an integer from 1 to 10, or a mixture of said (meth)acrylate monomer and an alkyl acrylate having an alkyl ester comprising an alcohol having 1 to 8 carbon atoms; and about 20.0 to about 0.1% by weight of crosslinking monomer copolymerizable with the said (meth)acrylate monomer.

2. A (meth)acrylate copolymer according to claim 1, wherein in said (meth)acrylate copolymer the content of said alkyl acrylate having an alkyl ester comprising alcohol of 1 to 8 carbon atoms is about 5.0 to about 94.9% by weight per the total amount of (meth)acrylate monomer and the alkyl acrylate.

3. A (meth)acrylate copolymer according to claim 2, wherein in said (meth)acrylate copolymer the content said alkyl acrylate having an alkyl ester comprising alcohol of 1 to 8 carbon atoms is about 10.0 to about 89.5% by weight per the total amount of the (meth)acrylate monomer and the alkyl acrylate.

4. A (meth)acrylate copolymer according to claim 1, wherein said alkyl acrylate having an alkyl ester comprising alcohol of 1 to 8 carbon atoms is at least one member selected from the group consisting of ethyl acrylate, n-butyl acrylate and iso-butyl acrylate.

5. A (meth)acrylate copolymer according to claim 1, wherein said alkyl acrylate having an alkyl ester comprising alcohol of 1 to 8 carbon atoms is n-butyl acrylate.

6. A (meth)acrylate copolymer according to claim 5, wherein the content of n-butyl acrylate is about 5 to about 50% by weight.

7. A (meth)acrylate copolymer according to claim 5, wherein the content of n-butyl acrylate is about 10 to about 40% by weight.

8. A (meth)acrylate copolymer according to claim 1, wherein the total number of carbon atoms of $R^2$ and $R^3$ is 4 to 9.

9. A (meth)acrylate copolymer according to claim 1, wherein said (meth)acrylate copolymer has a viscosity average molecular weight of about 10 thousand to about to 5 million.

10. A (meth)acrylate copolymer according to claim 1, wherein m is 1.

11. A (meth)acrylate copolymer comprising about 80.0 to about 99.9% by weight of a (meth)acrylate monomer having a structure represented by the following formula (I):

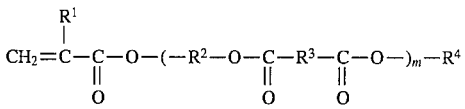

wherein $R^1$ represents a hydrogen atom or a methyl group, $R^2$ and $R^3$ each independently represent an alkylene group having 1 to 20 carbon atoms, a phenylene group or a cyclohexanylene group, $R^4$ represents an alkyl group having 1 to 20 carbon atoms, a phenyl group or a substituted a phenyl group which is at least one member selected from the group consisting of benzyl, 2-methyl phenyl, 3-methyl phenyl and 4-methyl phenyl, and m represents an integer 1 to 10, or a mixture of said (meth)acrylate monomer and at least one alkyl acrylate selected from the group consisting of ethyl acrylate, n-butyl acrylate and iso-butyl acrylate, wherein said alkyl acrylate is present in an amount of about 5.0 to about 94.9% by weight of the total amount of (meth)acrylate monomer and the alkyl acrylate; and about 20.0 to about 0.1% by weight of crosslinking monomer copolymerizable with the said (meth)acrylate monomer.

12. A (meth)acrylate copolymer according to claim 11, wherein the total number of carbon atoms of $R^2$ and $R^3$ is 4 to 9.

13. A (meth)acrylate copolymer according to claim 11, wherein said (meth)acrylate copolymer has a viscosity average molecular weight of about 10 thousand to about to 5 million.

14. An elastomer composition comprising 100 parts by weight of a (meth)acrylate copolymer according to claim 1, about 5 to about 400 parts by weight of a carbon black and about 0.1 to about 20 parts by weight of a crosslinking agent.

15. A vulcanized rubber obtained by vulcanizing the elastomer composition according to claim 14.

* * * * *